(12) United States Patent
Vandike et al.

(10) Patent No.: US 11,506,111 B2
(45) Date of Patent: Nov. 22, 2022

(54) WORK VEHICLE HAVING AN INTAKE CLEANING SYSTEM WITH AN ALIGNMENT MECHANISM

(71) Applicant: DEERE & COMPANY, Moline, IL (US)

(72) Inventors: Nathan R. Vandike, Geneseo, IL (US); Megan L. Winchell, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 332 days.

(21) Appl. No.: 16/843,471

(22) Filed: Apr. 8, 2020

(65) Prior Publication Data

US 2021/0317774 A1  Oct. 14, 2021

(51) Int. Cl.
| | |
|---|---|
| *F01P 11/12* | (2006.01) |
| *F01P 11/06* | (2006.01) |
| *F01P 11/10* | (2006.01) |
| *B01D 46/00* | (2022.01) |
| *B01D 46/10* | (2006.01) |
| *B60K 11/08* | (2006.01) |
| *B01D 46/68* | (2022.01) |
| *B01D 46/70* | (2022.01) |

(52) U.S. Cl.
CPC .......... *F01P 11/06* (2013.01); *B01D 46/0004* (2013.01); *B01D 46/10* (2013.01); *B01D 46/68* (2022.01); *B01D 46/70* (2022.01); *B60K 11/08* (2013.01); *F01P 11/10* (2013.01); *F01P 11/12* (2013.01); *B01D 2279/40* (2013.01); *F01P 2011/063* (2013.01)

(58) Field of Classification Search
CPC ............................. F01P 11/12; F01P 2011/063
See application file for complete search history.

(56) References Cited

U.S. PATENT DOCUMENTS

| | | | | |
|---|---|---|---|---|
| 4,443,236 | A * | 4/1984 | Peiler | F01P 11/12 55/385.3 |
| 5,183,487 | A * | 2/1993 | Lodico | F01P 11/12 55/289 |
| 5,466,189 | A * | 11/1995 | Deutsch | F01P 11/12 460/119 |
| 7,878,171 | B2 | 2/2011 | Vandike et al. | |
| 8,097,050 | B2 * | 1/2012 | Johnson | B01D 46/682 460/98 |
| 8,197,567 | B2 * | 6/2012 | D'hondt | A01D 41/1252 55/471 |
| 8,230,959 | B2 | 7/2012 | Chaney et al. | |

(Continued)

*Primary Examiner* — Long T Tran
(74) *Attorney, Agent, or Firm* — Taft Stettinius & Hollister LLP; Stephen F. Rost (57) ABSTRACT

A cleaning apparatus of a work machine for cleaning debris from a screen mounted to a door of an engine cooling assembly. The cleaning apparatus includes a duct extending along the screen and along a first side of the door. The duct includes a duct end located at the door. A vacuum assembly is configured to draw a vacuum through the duct, wherein the vacuum assembly is detachably connected with the duct end. An alignment mechanism includes an aligner that extends from the duct to a frame of the work machine. The alignment mechanism aligns the duct end with the vacuum assembly to provide a seal between the duct and the vacuum.

20 Claims, 8 Drawing Sheets

(56) References Cited

U.S. PATENT DOCUMENTS

| | | | | |
|---|---|---|---|---|
| 8,454,718 | B2* | 6/2013 | Buchmann | F01P 11/12 55/393 |
| 8,573,342 | B2* | 11/2013 | Juptner | F01P 11/12 180/68.1 |
| 8,876,927 | B2* | 11/2014 | Hollatz | B60K 11/04 460/98 |
| 10,995,772 | B2* | 5/2021 | Clifford | F04D 29/703 |
| 2009/0211208 | A1 | 8/2009 | Johnson et al. | |
| 2017/0107893 | A1* | 4/2017 | Davenport | B60S 1/62 |
| 2020/0147536 | A1* | 5/2020 | Shriver | B01D 46/10 |

* cited by examiner

WORK VEHICLE HAVING AN INTAKE CLEANING SYSTEM WITH AN ALIGNMENT MECHANISM

FIELD OF THE DISCLOSURE

The present invention generally relates to a work vehicle, and more particularly to an intake cleaning system for a cooling system of a work vehicle.

BACKGROUND

Work vehicles including agricultural and construction vehicles are typically powered by internal combustion engines. Often, these vehicles are used in environments that are dirty, and the air contains dust and other particulate matter. Agricultural vehicles also work in environments where crop residue, as well as dirt and particulate matter are in the air. During operation, air is drawn into the frame of the vehicle and to the engine compartment for cooling the engine and to provide efficient combustion in the internal combustion engine. More particularly, the air supply should be free of particulate matter. In harvesting/construction environments, this generally requires an air filtration and/or cleaning system so that the air being pulled into the vehicle can be cleaned sufficiently to be utilized for engine combustion or cooling. Even with such filtration/cleaning systems, particulate matter, dirt and/or crop residue can block, or partially block the air intake systems, resulting in the need for the system to be cleaned at frequent intervals.

In addition, to providing for efficient combustion in the engine, the air drawn from the exterior of the frame into the vehicle provides for cooling of a cooling system directed to one or more coolers that include coolers to cool the engine, a hydraulic system, and a turbo charging system of an engine, if one is used.

The flow of air drawn from the exterior of the frame is directed initially through a screen attached to a door. Because the air includes particulate matter, the screen acts as barrier to the particulate matter to reduce or prevent the particulate matter from entering into the vehicle. Otherwise, the contaminated air can reduce the effectiveness of the systems located there or even damage those systems.

Over a period of time, the particulate matter carried by the air collects on the screen where it is removed by a vacuum system having a vacuum duct. In some cases, the door, to which the screen is attached, is opened for the purposes of cleaning or maintenance. Opening of the door disconnects the duct from the vacuum system located within the vehicle. Upon closing of the door, the duct is reconnected to the vacuum system. In some case, the duct does not correctly align with the vacuum system when the door is closed and may require re-positioning to achieve connection. What is needed therefore is a system and process to improved alignment of the duct to the vacuum system.

SUMMARY

In one embodiment, there is provided a cleaning apparatus for cleaning debris from a screen mounted to a door of an engine cooling assembly of a work machine having a machine frame. The cleaning apparatus includes a duct extending along the screen and a first side of the door, the duct extending through the door and having a duct end located at the door. A vacuum assembly is configured to draw a vacuum. The vacuum assembly is detachably connected with the duct end. An alignment mechanism is operatively connected to the duct, wherein the alignment mechanism aligns the duct end with the vacuum assembly.

In another embodiment, there is provided a work vehicle including a vehicle body having a vehicle frame and a door with a first side and a second side. The door is movably coupled to the frame. A cooling system is configured to generate a flow of air and includes a screen. The screen is coupled to the door to collect debris from the flow of air. A duct extends along the screen and the first side of the door. The duct includes a duct end located at the door. A vacuum assembly is configured to draw a vacuum and is detachably connected with the duct end. An alignment mechanism is operatively connected to the duct, wherein the alignment mechanism aligns the duct end with the vacuum assembly.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
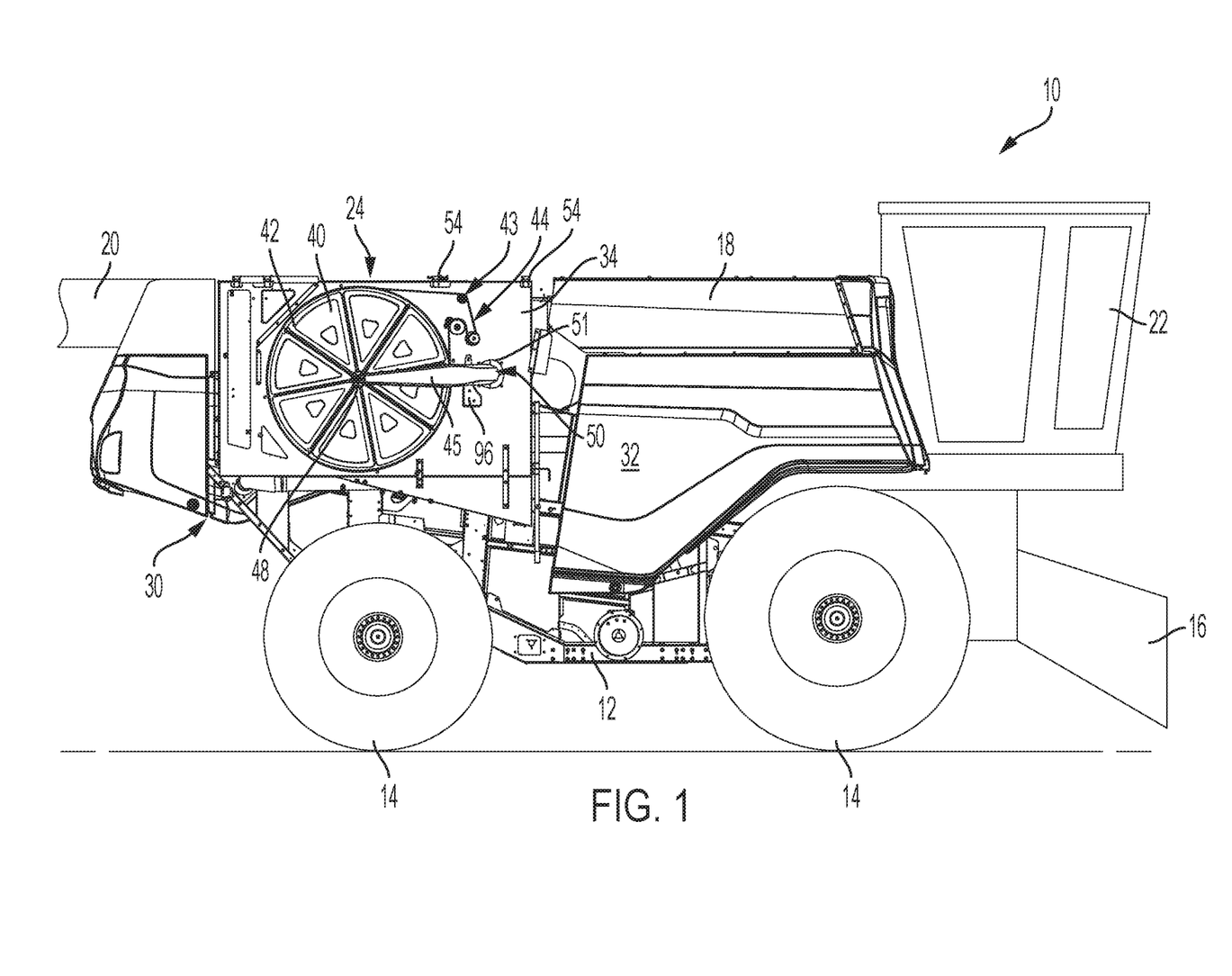
FIG. 1 is an elevational side view of a work vehicle.

Referring now to the drawings, and more particularly to FIG. 1, there is shown a work vehicle in the form of an agricultural harvesting machine, such as a self-propelled agricultural combine 10. The work vehicle can also be in the form of a different type of vehicle used in a dirty or debris-laden operating environment. Such work vehicles include, but are not limited to, an agricultural tractor, construction vehicles, forestry vehicles, lawn maintenance vehicles, as well as on-road vehicles such as those used to plow snow, spread salt, or vehicles with towing capability. Additionally, other agricultural vehicles include a towed combine harvester.

Combine 10 includes a supporting structure or body 12 having ground engaging wheels 14 extending from body 12. Although combine 10 is illustrated as having wheels 14, it could also have ground engaging tracks, either full tracks or half-tracks. The combine 12 also has a feeder house 16 through which harvested crop material is fed into the combine 10 for processing. Once processed, the harvested crop material is stored in a grain tank 18 and unloaded from the combine 10 through an unloading auger 20. The operation of combine 10 is controlled from an operator's cab 22.

Mechanical power for combine 10 is provided by an internal combustion engine (not shown) contained in an engine compartment 24 in the rear portion of the combine 12. The combine 10 has a number of body panels surrounding the sides and rear of the combine, including, but not limited to: a rear panel 30, left side panels (not shown), right side panel 32, and radiator door 34, adjacent to the area of the engine compartment 24 where a radiator is located.

A cooling system, a part of which is attached to the door 34, includes a screen 40 coupled to the door 34 by a frame 42. The screen 40 filters ambient air being drawn into the engine compartment 24. The screen 40, in one configuration, includes a panel with one or more screens. In one or more embodiments, the screen 40 is a rotary screen that is rotated by a screen driver 43 having components located on both sides of the door 34. See FIGS. 2 and 3. In other embodiments, a stationary screen is included. The screen, as described herein, is a rotary screen 40 driven by a belt 44. A fan (not shown) is located in the interior of the vehicle and pulls air through the screen 40 as is understood by those skilled in the art.

A duct 45 is operatively connected to the frame 42 which is coupled to a vacuum assembly 46. (See FIG. 2) A first end 48 of the duct 45 is fixedly coupled to the frame 42 and is generally located at a center of the circularly shaped screen 40. A portion 50 of the duct 45 is coupled to the door 34, with a flexible flange 51, and extends through the door 34 where it terminates at a terminating end 52 where it is releasably connected to the vacuum assembly 46. (See FIGS. 3 and 4). The flexible flange 51 provides for movement of the duct 45, if needed, during alignment of the duct 45 with the vacuum assembly 46. In one or more different embodiments, the terminating end 52 of the duct 45 is located at the door 34 and does not extend through the door. In other embodiments, the terminating end 52 of the duct 45 is spaced from the door 34 and is externally located with respect to the door.

One or more hinges 54 hingedly connects the door 34 to the vehicle 10. In one embodiment, the door 34 rotates about a generally horizontal axis defined by a top edge of the door 34. Other axes of rotations are contemplated.

Figure 3:
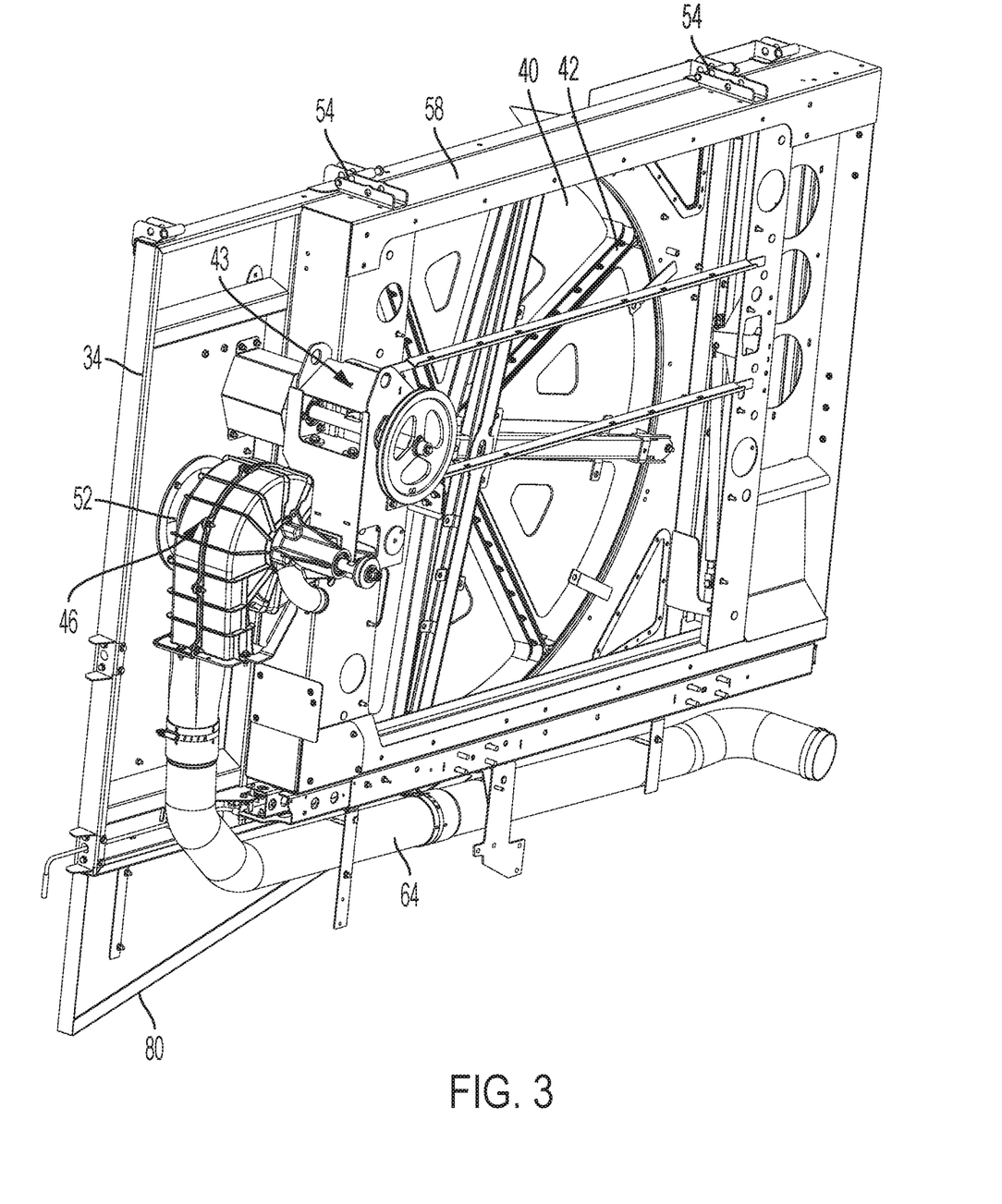
FIG. 3 is a rear side perspective view of a cooling system of the work vehicle.

As seen in FIG. 3, a frame 58, which is coupled to the vehicle frame 12 (not shown), supports the vacuum assembly 46 and the screen driver 43. The hinges 54 are coupled to the frame 58 which provide for rotation of the door 34 with respect to the frame 58.

Figure 4:
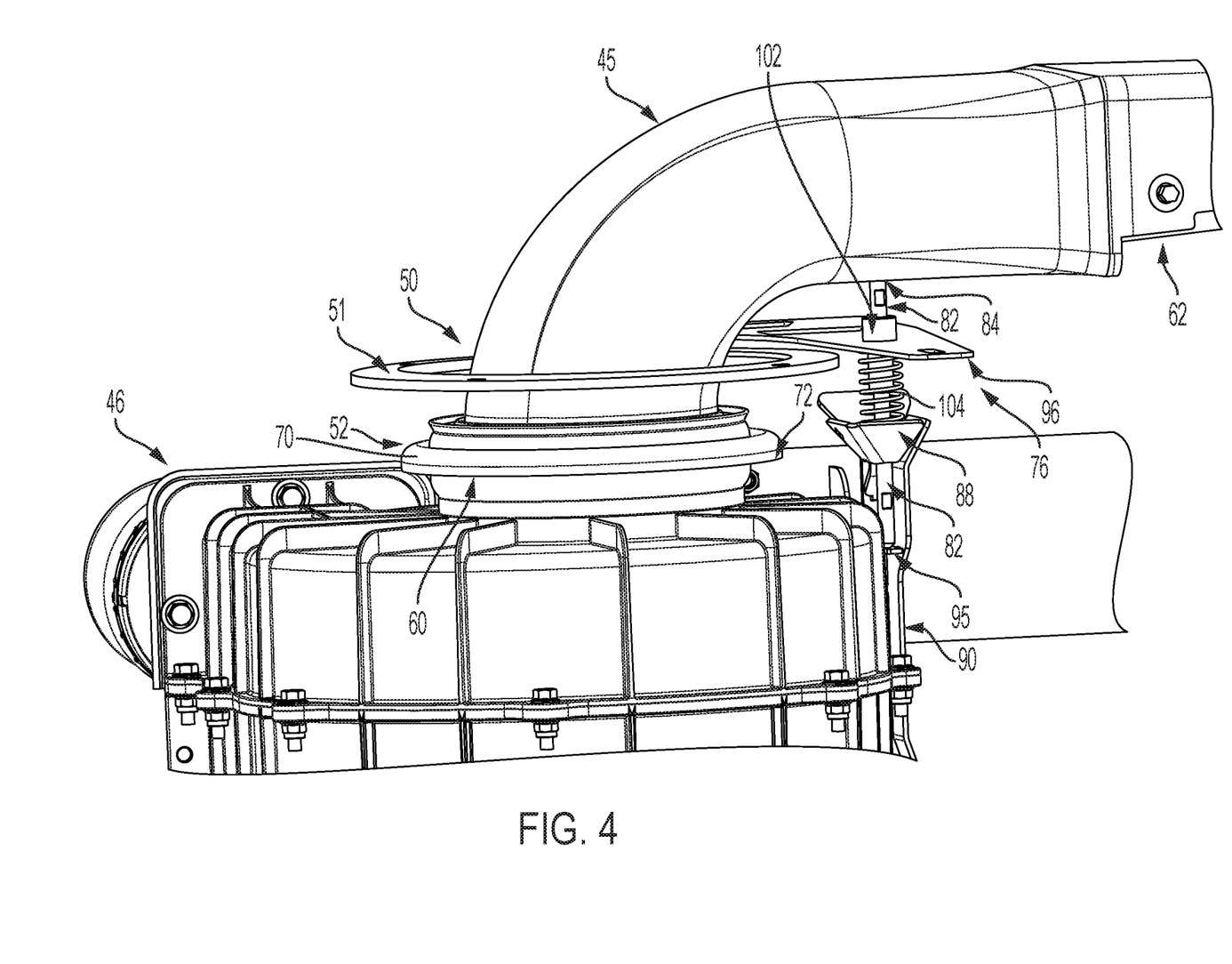
FIG. 4 is a top view of a duct and vacuum system interface.

When the door 34 is in the closed position, as in FIGS. 3-4, the terminating end 52 is operatively connected to an inlet 60 of the vacuum assembly 46. The end 50 of the duct 45 extends through the door such that the terminating end 52 is located on a backside of the door to enable coupling of the terminating end 52 with the inlet 60 of the vacuum assembly 46. The duct 45 includes an open side 62 that extends along the screen 40 such that a vacuum provided by the vacuum assembly 46 is drawn through the open side 62 to remove dirt, debris, and particulate matter located on the screen 40. The removed matter is expelled through a vacuum duct 64 where it falls to the ground or to a collector.

The door 34 of cooling system intake cleaning systems of combine harvesters are typically opened to access the cooling system located within the vehicle for maintenance cleaning. This often means that the cleaning system duct 45 and the cleaning system vacuum source 46 are independent and separate elements that are disconnected when accessing the cooling system for cleaning and then reconnected once maintained. Because of this requirement, and the fact that component dimensions "stack up", misalignment between the duct 45 and vacuum source 46 can be quite large due to variations in component dimensions resulting from manufacturing tolerances. Consistent alignment of the two components with respect to one another can, therefore, be a challenge. However, it is critically important for the functionality of the system that the two components are closely aligned and the relative positions controlled. In addition, movement of the door should not interfere with the connection of the terminating end 52 to the inlet 60 which can result in damage. In the past, such alignment requires visual checks and requires that many adjustments are made during the assembly process and the cleaning process. In some previously known cases, because of the stack up of tolerances in all 3 directions (X, Y, Z), it may not be possible to complete the alignment to the desired level with the fixed point adjustments given.

When the door 34 is in the closed position the terminating end 52 extends into the vehicle where a sealing flange 70 at the terminating end 52 is positioned to engage the inlet 60 of the vacuum assembly 46 (see FIG. 4). The sealing flange 70 is fixedly coupled to duct 45 that is flexibly coupled to the door 34 with the flexible flange 51. The sealing flange 70 includes a rim 72 having a size sufficient to interface with the inlet 60 of the vacuum assembly 46. The interface between the sealing flange 70 and the inlet 60 is configured to provide a detachable connection and when connected a relatively airtight seal between the duct 45 and the vacuum assembly 48 such that air loss is relatively negligible at the interface.

In one embodiment, a rubber gasket type seal is fixed or mounted to the vacuum source at the inlet 60, and this seal is compressible when flange 70 comes in contact with the seal and serves to make an airtight seal. In other embodiments, the flange 70 includes a rubber gasket type seal what compresses when contacting relatively non-flexible inlet 60. In different embodiments, the flexible seal that serves to make the airtight seal, whether located at the inlet 60 or the flange 70 is made of sealing compressible materials other than rubber.

To account for the potential misalignment of parts in all directions, sufficient variability in alignment positioning to account for the tolerance stack is built into the components. To meet manufacturing requirements, it is preferred to avoid positional adjustment to multiple parts, which can lead to extended manufacturing times resulting in loss of revenue. The described embodiments provide a means of engaging the duct 45 to the vacuum system 46, and through the disclosed embodiments, enables the duct 45 to be aligned with the inlet 60 without repeated visual checks. The position of the duct 45 to the vacuum source 46 at a mating interface is more consistent than current systems.

An alignment mechanism 76 (see FIGS. 4 and 5) is operatively connected to the door 34, the frame 58 and to the duct 45. As the door 34 is opened, a bottom portion 80 (See FIG. 2) of the door 34 swings away from the vehicle frame 12 about horizontal axis located at the hinges 54. As the door 34 moves, the flange 70 moves away from the inlet 60 of the vacuum assembly 46. At the same time, a rod or pin 82 of the alignment mechanism 76 moves with the door 34. A first end 84 of the rod 82 is fixedly connected to the duct 45 and a second end 86 of the rod 82 is a free terminating end. As the door 34 opens, the rod 82 moves through a locator or directing component 88. Opening of the door 34 a sufficient amount completely removes the rod 82 from the locator 88.

Figure 5:
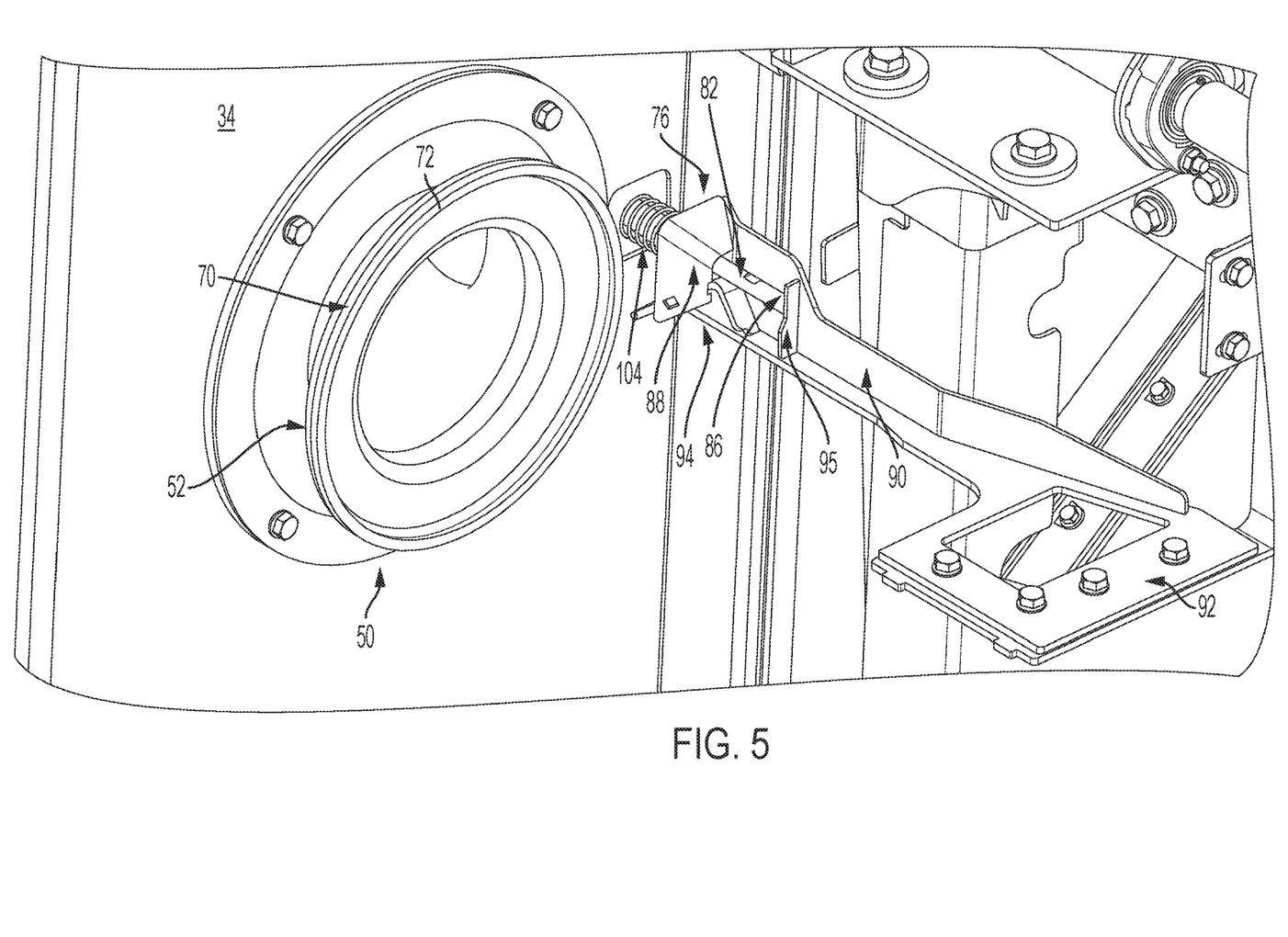
FIG. 5 is an perspective end view of a vacuum duct coupled to a vehicle door and an alignment mechanism coupled to a vehicle frame.

The locator 88 of the alignment mechanism 76 is fixedly coupled to a locator support 90 that is fixedly connected to the frame 58. The locator support 90 has a first end 92 coupled to the frame 58 and a second end 94 that supports the locator 88. A rod stop 95 is fixedly connected to the locator support and is disposed between the first end 92 and the locator 88. In one embodiment, the locator 88, the locator support 90 and the rod stop 92 are a receiving and alignment mechanism configured to receive the rod 88 to align the flange 70 with the inlet 60.

The locator 88 is a conically shaped directing component that is mounted in close control/tolerance to the vacuum source 46. Since the rod end 84 is coupled to the duct 45 and the free end 86 is located by the locator 88, the terminating end 52 aligns with the vacuum inlet 60. The location of the rod 82 mounted to the duct 45 is predetermined to insure a relative mating position between the vacuum inlet 60 and the rim 72.

Figure 2:
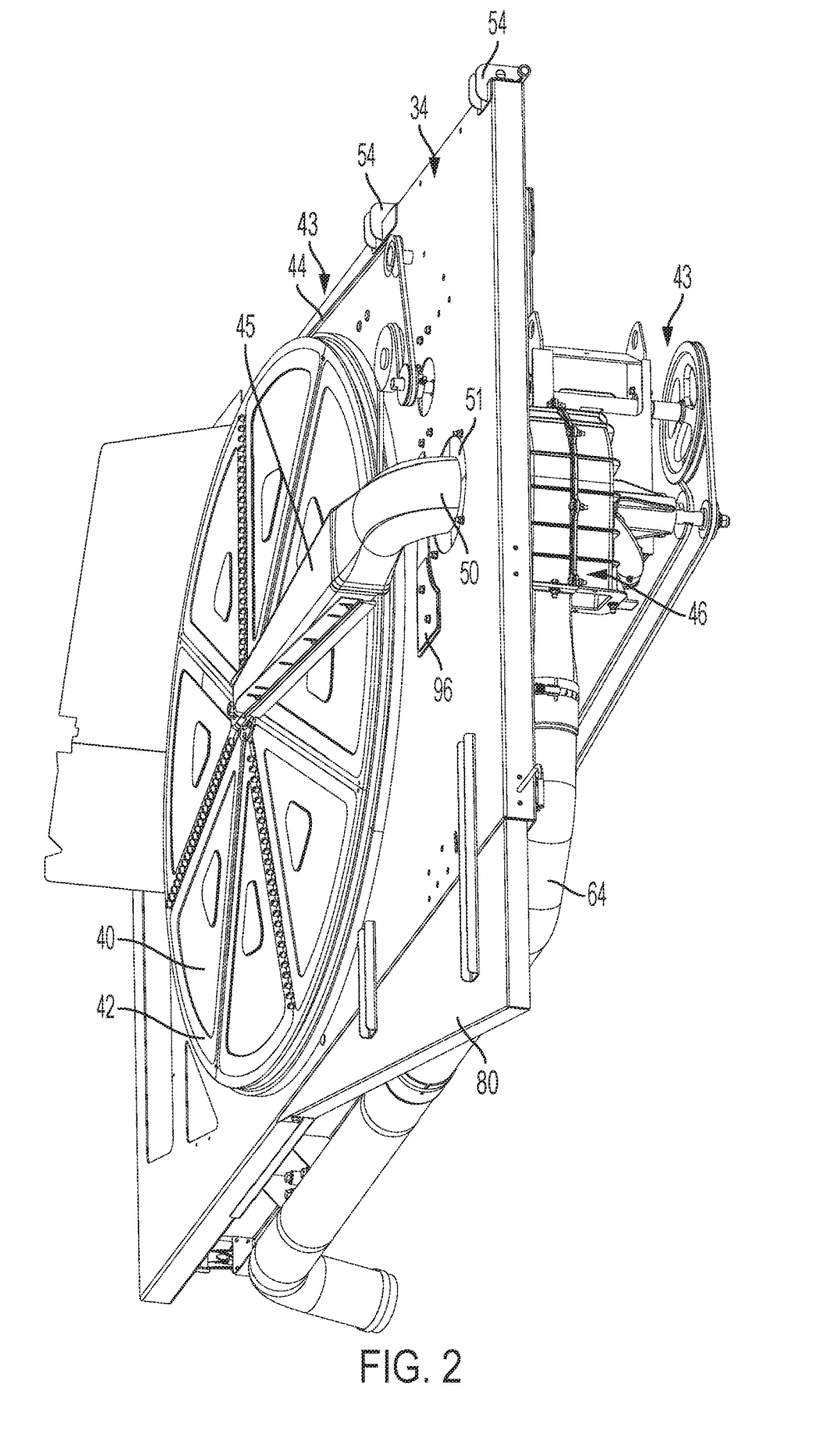
FIG. 2 is a front side perspective view of a cooling system of the work vehicle.
Figure 6:
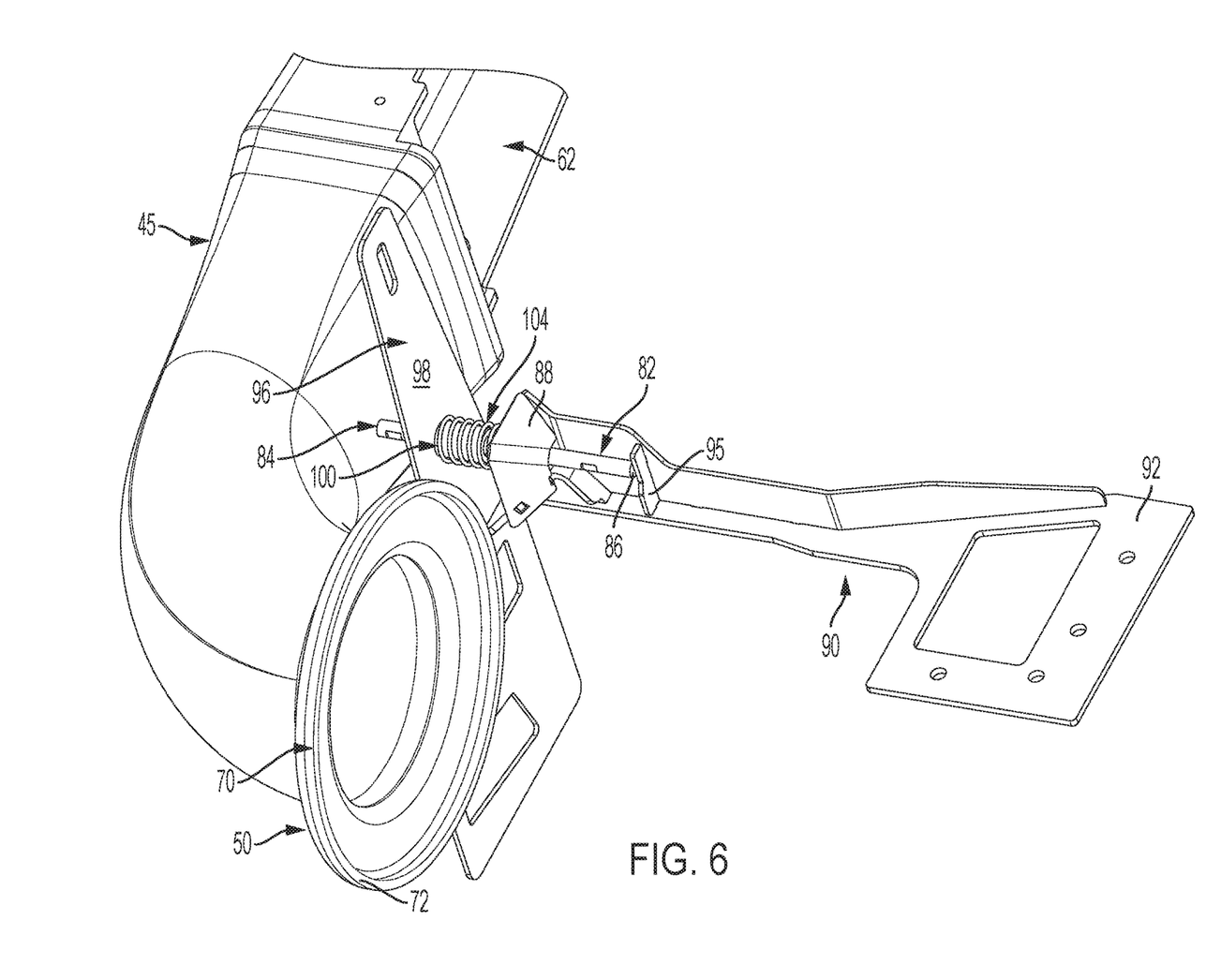
FIG. 6 is a perspective view of an alignment mechanism operatively connected to a vacuum duct.

To insure that the duct 45 remains relatively stationary with the door 34, a door support 96 of FIG. 6 is fixedly coupled to the door 34 (See also FIGS. 1 and 2). An interior side 98 of the door support is fixedly connected to the door 34 and includes an aperture 100 through which the rod 82 extends. A corresponding aperture in the door 34 is generally aligned with the aperture 100. The rod 82 therefore extends from the duct 45, through the support 96, and through the door 34.

The rod 82 also extends through a sleeve 102 and a spring 104. (See FIGS. 7 and 8). The sleeve 102 includes a first portion 106, having a first diameter, extending from a second portion 108, having a second diameter, wherein the second diameter of the second portion is greater than the first diameter of the first portion. The first diameter is sized to fit within an aperture 110 of the door support 96 and the second diameter is larger than the aperture 110 which acts a stay or abutting surface to position the end of the second portion 108 at the surface 98 of the support 96.

Figure 7:
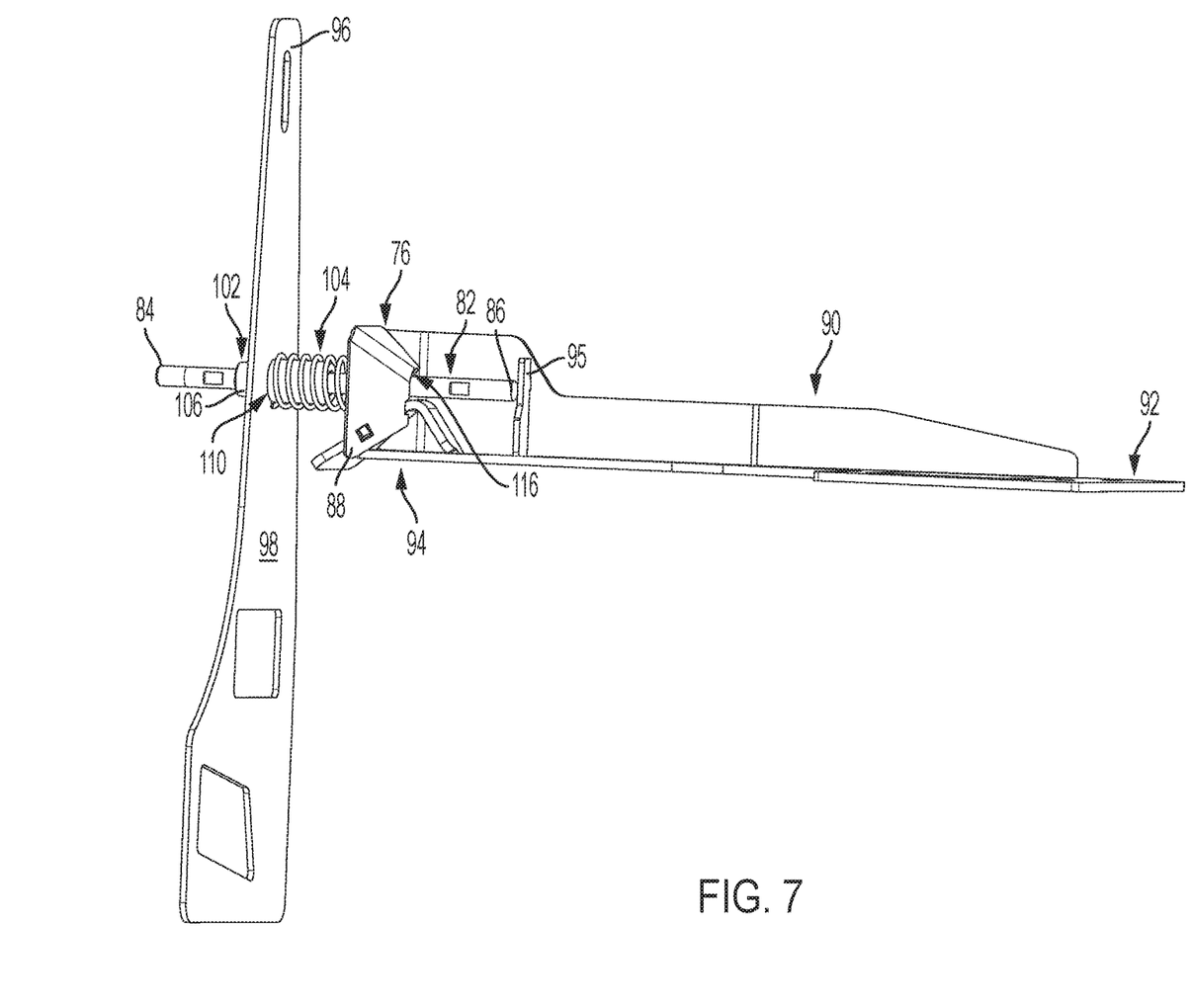
FIG. 7 is a perspective side view an alignment mechanism coupled to a door support.
Figure 8:
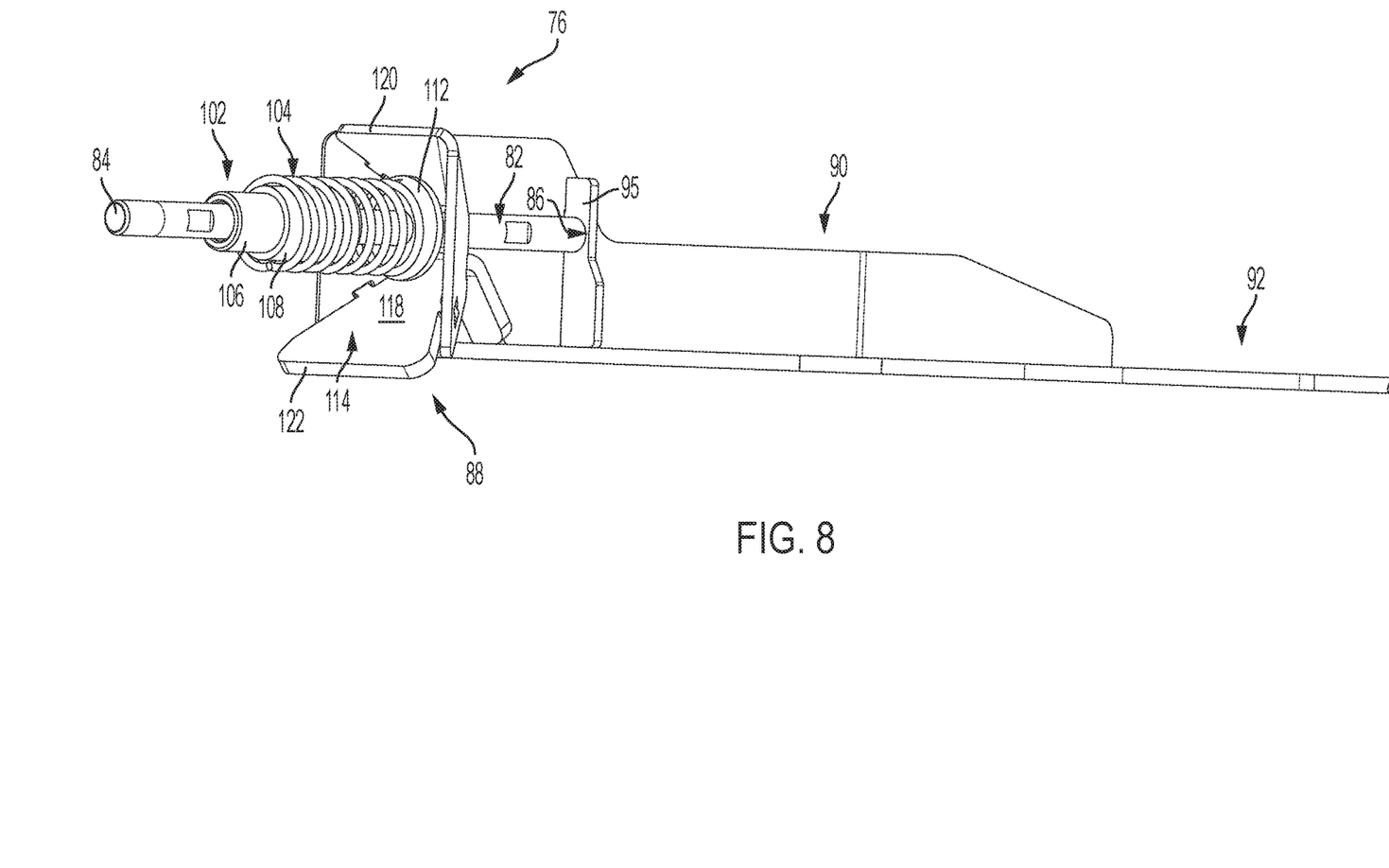
FIG. 8 is a front perspective view an alignment mechanism.

While the end 84 of the rod is fixedly connected to the duct 45, the rod 82 is slidably connected to the sleeve 102, such that the rod 82 is free to move within the sleeve 102 as the sleeve remains stationary with respect to the support 96 and the door 34. The spring 104 is spaced between the inside surface of the door 34 and a spring stop 112 which is fixedly connected to the rod 82. In one embodiment, the spring stop 112 is a washer or flange backed up by a sleeve fixed to the rod 82. Because the rod 82 moves with respect to the sleeve 102, which is fixed with respect to the support 96 and therefore the door 34, the duct 45 is configured to flex with respect to the door 34 where the duct 45 is coupled to the end of the rod 84.

The spring 104, that is mounted against the inside of the door pushes on the stop 112 to effectively "pull" the duct 45 and consequently the flange 70 to interface with the inlet 60. As the duct is pulled, the rod 84 is also pulled such that the rod and the spring 104 act as an aligner to engage the mounting surface of the flange 70 to the inlet 60 but also to position lateral alignment of the flange with the inlet 60. The spring 104 prevents the duct 45 from falling off of the interfacing surfaces of the flange 70 and the inlet 60, as well as pulling the duct to the desired position of mating between the components if the tolerance is significantly in the (positive) direction. This spring 104 also serves as the compliance component for when the tolerances stack up in the (negative) direction. In other embodiments, other resilient elements, instead of a spring, are contemplated.

When the door 34 is in an open position, the rod 82 is completely withdrawn from the locator 88. When the door 34 is in the process of being closed, the free end 86 of the rod 82 is directed toward the locator 88 due the predetermined alignment of the door 34 and the vacuum assembly 46. Because each of the various parts of the door 34, the vacuum assembly 46, and the frame 58 supporting the vacuum assembly 46, include variations in physical dimensions, i.e. tolerances, the alignment of the flange 70 with the inlet 60 may be partially misaligned due to tolerance stackup. To adjust alignment of the flange 70 with the inlet 60, if necessary, when the door 34 is being closed, the free end 86 of the rod 82 moves toward an inlet 114 of the locator 88 where it is directed toward an outlet 116 of the locator 88. (See FIG. 7) The locator 88 includes inner walls 118 that are inclined with respect to a longitudinal axis of the rod 82 when the rod 82 is located as illustrated in FIG. 7. If there is a misalignment, as the rod 82 enters the inlet 114, the end 86 of the rod 82 contact the inner walls 118. Contact of the rod 82 with the inner walls 118 guides the end 86 of the rod toward the outlet 116. Once the end 86 enters the outlet 116, the door 34 closed, or close to being closed, and the flange 70 is sufficiently aligned with the inlet 60 to make a sealing fit between the flange 70 and the inlet 60.

As the door 34 moves to a closed position, further movement of the door is prevented by the stop 95. During this movement, the spring 104 is compressed between the spring stop 112 and the support 96 to provide an indication to a user that the door 34 is near to the completely closed position. A predetermined length of the rod 82 permits the door 34 to be fully closed, but not to be moved past the sealing location of the duct 45 with the inlet 60, which substantially reduces or prevents damage to the door 34, the duct 45, the flange 70, the inlet 60, and the vacuum assembly 46.

In one embodiment, the locator 88 includes more than one part, including a first part 120 and a second part 122 coupled to the first part 120. Other embodiments are contemplated including a single unitary part having planar sidewalls or having one or more curved sidewalls, such as included in a cone.

As disclosed herein, the inlet 114, which initially receives the end 86 of the locator 88 is large enough to capture and guide the rod 82 during initial assembly of the vehicle, when the tolerance stack ups are in their greatest expected positions (in this case the X and Z directions of the harvester 10). The locator 88 narrows to the smaller opening, aperture 116. Aperture 116 is just large enough to allow the rod 82 to pass through the aperture 116, thus controlling the center position of the rod 88 relative to the vacuum source 46. Behind the conical shaped element locator 88 is the fixed stop 95, which is positioned relative to the mating face of the inlet 60 of the vacuum source 46. The rod 82 extends sufficiently through the locator 88 and through the smallest opening 116 such that alignment in those two controlled directions is achieved. The length of the rod 82 is determined based on the maximum allowable compression (flexibility) of the mating duct/source such that the rod 82 will contact the fixed stop 95 if the tolerance stack up is significantly (negative) in the Y-direction.

While exemplary embodiments incorporating the principles of the present invention have been disclosed hereinabove, the present invention is not limited to the disclosed embodiments. Instead, this application is intended to cover any variations, uses, or adaptations of the invention using its general principles. Consequently, this application is intended to cover such departures from the present disclosure as come within known or customary practice in the art to which this invention pertains.

The invention claimed is:

1. A cleaning apparatus for cleaning debris from a screen mounted to a door of an engine cooling assembly of a work machine having a machine frame, the cleaning apparatus including:
   a duct extending along the screen and a first side of the door, the duct having a first end located on the first side of the door and a duct terminating end located at a second side of the door;
   a vacuum assembly configured to draw a vacuum through the duct and through the door and being detachably connected with the duct terminating end;
   an alignment mechanism operatively connected to the door, wherein the alignment mechanism aligns the duct terminating end with the vacuum assembly when the door moves from an open position to a closed position.

2. The cleaning apparatus of claim 1 wherein the vacuum assembly includes a vacuum input wherein the duct terminating end is detachably connected to the vacuum input.

3. The cleaning apparatus of claim 2 wherein alignment mechanism includes an aligner and the aligner extends from the door to the machine frame.

4. The cleaning apparatus of claim 3 wherein the alignment mechanism includes a support and the aligner is slidingly coupled to the support.

5. The cleaning apparatus of claim 3 wherein the aligner is resiliently coupled to the support.

6. The cleaning apparatus of claim 3 wherein the alignment mechanism includes a locator wherein the locator directs the aligner to a predetermined location, wherein the predetermined location substantially aligns the duct terminating end to the vacuum input.

7. The cleaning apparatus of claim 6 wherein the locator includes an opening and a sloping side to direct the aligner from the opening toward a centrally located end of the locator.

8. The cleaning apparatus of claim 7 wherein the alignment mechanism includes a stop and contact of the aligner with the stop substantially prevents further movement of the duct terminating end with respect to the vacuum input.

9. The cleaning apparatus of claim 8 wherein the aligner includes a rod and a spring, the rod extending through the spring and into the locator.

10. The cleaning apparatus of claim 9 wherein the spring compresses as the rod moves along its longitudinal axis.

11. A work vehicle comprising:
   a vehicle body including a vehicle frame and a door having a first side and a second side, the door movably coupled to the vehicle frame;
   a cooling system, to generate a flow of air, including a screen, the screen coupled to the door to collect debris from the flow of air;
   a duct extending along the screen and the first side of the door, the duct having a first end located on the first side of the door and a duct terminating end located at one of the door or at the second side of the door;
   a vacuum assembly, located on the second side of the door, the vacuum assembly configured to draw a vacuum and being detachably connected with the duct terminating end; and
   an alignment mechanism operatively connected to the door, wherein the alignment mechanism aligns the duct terminating end with the vacuum assembly when the door moves from an open position to a closed position.

12. The work vehicle of claim 11 wherein the vacuum assembly includes a vacuum input wherein the duct terminating end is detachably connected to the vacuum input.

13. The work vehicle of claim 12 wherein the alignment mechanism includes an aligner and the aligner extends from the door to the vehicle frame.

14. The work vehicle of claim 13 wherein the alignment mechanism includes a support and the aligner is slidingly coupled to the support.

15. The work vehicle of claim 13 wherein the aligner is resiliently coupled to the support.

16. The work vehicle of claim 15 wherein the alignment mechanism includes a locator wherein the locator directs the aligner to a predetermined location, wherein the predetermined location substantially aligns the duct terminating end to the vacuum input.

17. The work vehicle of claim 16 wherein the locator includes an opening and a sloping side to direct the aligner from the opening toward a centrally located end of the locator.

18. The work vehicle of claim 17 wherein the alignment mechanism includes a stop and contact of the aligner with the stop substantially prevents further movement of the duct terminating end with respect to the vacuum input.

19. The work vehicle of claim 18 wherein the aligner includes a rod and a spring, the rod extending through the spring and into the locator.

20. The work vehicle of claim 19 wherein the spring compresses as the rod moves along its longitudinal axis.

* * * * *